(12) United States Patent
Corbally et al.

(10) Patent No.: US 12,546,745 B2
(45) Date of Patent: Feb. 10, 2026

(54) ELECTROCHEMICAL AUTHENTICATION METHOD

(71) Applicant: ELUCEDA LIMITED, Burnley (GB)

(72) Inventors: Adam Richard Corbally, Yorkshire (GB); Ian Michael Eastwood, Lancashire (GB)

(73) Assignee: ELUCEDA LIMITED, Burnley (GB)

( * ) Notice: Subject to any disclaimer, the term of this patent is extended or adjusted under 35 U.S.C. 154(b) by 562 days.

(21) Appl. No.: 17/777,006

(22) PCT Filed: Nov. 16, 2020

(86) PCT No.: PCT/GB2020/052925
§ 371 (c)(1),
(2) Date: May 13, 2022

(87) PCT Pub. No.: WO2021/094788
PCT Pub. Date: May 20, 2021

(65) Prior Publication Data
US 2022/0404311 A1    Dec. 22, 2022

(30) Foreign Application Priority Data
Nov. 15, 2019    (GB) ........................ 1916696

(51) Int. Cl.
*G01N 27/48*    (2006.01)
*G01N 33/14*    (2006.01)
*G01N 33/15*    (2006.01)

(52) U.S. Cl.
CPC .......... *G01N 27/48* (2013.01); *G01N 33/146* (2013.01); *G01N 33/15* (2013.01)

(58) Field of Classification Search
CPC ....... G01N 33/146; G01N 33/15; G01N 27/48
See application file for complete search history.

(56) References Cited

U.S. PATENT DOCUMENTS

| 5,124,011 A | 6/1992 | Rodgers et al. |
| 8,105,475 B2 | 1/2012 | Tixier et al. |
| (Continued) | | |

FOREIGN PATENT DOCUMENTS

| CN | 106932450 A | 7/2017 |
| WO | WO-2010/142037 A1 | 12/2010 |

OTHER PUBLICATIONS

Haddi et al., Instrumental assessment of red meat origins and their storage time using electronic sensing systems, Analytical Methods, vol. 7, pp. 5193-5203 (2015) (Year: 2015).*

(Continued)

*Primary Examiner* — James Lin
*Assistant Examiner* — Vivian A Tran
(74) *Attorney, Agent, or Firm* — Foley & Lardner LLP

(57) ABSTRACT

The present invention relates to a method for product identification comprising subjecting a sample to cyclic voltammetry, wherein the sample is subjected to a plurality of voltammetric cycles to obtain a data set for each cycle and wherein the data sets comprise data points; and comparing the data set for each cycle with a data set for a corresponding cycle of at least one known product to determine whether the sample is the known product. The present invention further relates to a method for determining a profile for a known product, which may be used in determining the identity of a sample.

10 Claims, 10 Drawing Sheets

(56) References Cited

U.S. PATENT DOCUMENTS

| | | | |
|---|---|---|---|
| 8,758,584 | B2 | 6/2014 | Kahn et al. |
| 9,846,136 | B2 | 12/2017 | Wu et al. |
| 2014/0141120 | A1 | 5/2014 | Ugliano et al. |
| 2017/0168014 | A1* | 6/2017 | Conte .................. G01N 27/48 |
| 2019/0033389 | A1 | 1/2019 | Wolfschmidt et al. |

OTHER PUBLICATIONS

Gutierrez et al., Hybrid electronic tongue for the characterization and quantification of grape variety in red wines, Sensors and Actuators B: Chemical, vol. 156, Issue 2, pp. 695-702 (2011) (Year: 2011).*

International Preliminary Report on Patentability for PCT Appl. Ser. No. PCT/GB2020/052925 mailed May 27, 2022 (8 pages).

"A Simple Approach for Determination and Direct Monitoring of Drug Degradation in Water" Soomroo Et Al, Dec. 2013, Current World Environment 8(3):375-380.

"An electronic tongue based on voltammetry", Winquist Et Al, vol. 357, Issues 1-2, Dec. 30, 1997, pp. 21-31 (11 pages).

"Bioelectronic tongue for the simultaneous determination of urea, creatinine and alkaline ions in clinical samples", Gutierrez Et Al., Biosens Bioelectron, Jan. 18, 2008;23(6):795-802.

"Caffeine determination at a carbon fiber ultramicroelectrodes by fast-scan cyclic voltammetry", Nunes Et Al, Journal of the Brazilian Chemical Society, vol. 23 No. 4 Sao Paulo Apr. 2012.

"Chemometric analysis of square wave voltammograms for classification and quantitation of untreated beverage samples", Schreyer Et Al, Sensors and Actuators B: Chemical vol. 71, Issues 1-2, Nov. 15, 2000, pp. 147-153.

"Electrochemical Sensor Arrays for the Analysis of Wine Production", Kutyla-Olesiuk Et Al., Dec. 2014, Procedia Engineering 87:580-583.

"Electronic tongue based on chemically modified electrodes and voltammetry for the detection of adulterations in wines", Parra Et Al., Sensors and Actuators B: Chemical, vol. 118, Issues 1-2, Oct. 25, 2006, pp. 448-453.

"Hybrid electronic tongue for the characterization and quantification of grape variety in red wines", Gutierrez Et Al., Sensors and Actuators B: Chemical vol. 156, Issue 2, Aug. 2011, pp. 695-702.

"Multisensor system on the basis of an array of non-specific chemical sensors and artificial neural networks for determination of inorganic pollutants in a model groundwater", Rudnitskaya Et Al., Talanta vol. 55, Issue 2, Aug. 30, 2001, pp. 425-431.

"Nonspecific sensor arrays ("electronic tongue") for chemical analysis of liquids" (IUPAC Technical Report), Vlasov Et Al., Pure and Applied Chemistry, vol. 77, No. 11, pp. 1965-1983, 2005.

"Screening and authentication of tea varieties based on microextraction-assisted voltammetry of microparticles", Dominguez Et Al., Sensors and Actuators B: Chemical vol. 210, Apr. 2015, pp. 491-499.

"Taste sensor with global selectivity", Toko Et Al., Materials Science and Engineering: C vol. 4, Issue 2, Jun. 1996, pp. 69-82.

"Use of copper and gold electrodes as sensitive elements for fabrication of an electronic tongue: Discrimination of wines and whiskies", Novakowski Et Al., Microchemical Journal vol. 99, Issue 1, Sep. 2011, pp. 145-151.

Examination Report on EPO App. 20 811 084.1-1001 dated Oct. 9, 2023 (7 pages).

Gonzalez Asael Et Al: "Untargeted voltammetric approaches for characterization of oxidation patterns in white wines", Food chemistry, vol. 269, Dec. 1, 2018 (Dec. 1, 2018), pp. 1-8, XP093088237, NL ISSN: 0308-8146, DOI: 10.1016/j.foodchem.2018.06.104.

Makhotkina O Et Al: "The use of cyclic voltammetry for wine analysis: Determination of polyphenols and free sulfur dioxide", Analytica Chimica Acta, Elsevier, Amsterdam, NL, vol. 668, No. 2, Jun. 4, 2010 (Jun. 4, 2010), pp. 155-165, XP027054318, ISSN: 0003-2670 [retrieved on Apr. 24, 2010].

Haddi et al: "Instrumental assessment of red meat origins and their storage time using electronic sensing systems." Analytical Methods, vol. 7, No. 12, May 11, 2015, pp. 5193-5203.

Search Report dated Mar. 4, 2020, for GB1916696.6 (5 pages).

International Search Report and Written Opinion dated Feb. 10, 2021 for Application No. PCT/GB2020/052925. (13 pages).

Qiang Zhang et al: "Electrochemistry of White Wine Polyphenols Using PEDOT Modified Electrodes". Beverages, vol. 3, No. 3, Jun. 28, 2017, p. 28.

Safe Er Ahmed et al: "Voltammetric monitoring of gamma radiolytic degradation of phenols". Journal of Applied Electrochemistry, Kluwer Academic Publishers, DO, vol. 42, No. 8, Jun. 20, 2012, pp. 607-614.

* cited by examiner

ELECTROCHEMICAL AUTHENTICATION METHOD

CROSS-REFERENCE TO RELATED APPLICATIONS

This application is a U.S. National Phase Application of International Application No. PCT/GB2020/052925, filed Nov. 16, 2020, which claims the benefit of Great Britain Patent Application No. 1916696.6, filed Nov. 15, 2019, which are hereby incorporated by reference in their entirety.

FIELD OF THE INVENTION

The present invention relates to a method for product identification, in particular to an electrochemical method for product identification.

BACKGROUND OF THE INVENTION

The ability to accurately identify genuine products is a necessary tool to combat counterfeiting operations. Counterfeit products not only destroy brands, but they also ruin the livelihoods of legitimate business owners, reduce government income via taxation and, more importantly, can pose a threat to public health. In particular, this is due to a lack of control over the materials used in the substitution, such as alcohol containing methanol, glycols or pigments containing heavy metals.

Known product identification techniques are typically complex and may require the addition of a marker chemical to goods during the manufacturing process. An assay is then developed and used to detect the marker and ascertain whether the product is genuine or not. However, the addition of such a marker adds cost and complexity to the manufacturing process. Moreover, the type of marker added to the product may be strictly controlled, depending on the type of product being produced. For example, in the food and beverage industry the marker must be safe for consumption and not interfere with the taste/shelf-life of the product concerned. Pharmaceuticals such as ibuprofen and paracetamol have similar restrictions in regard to the safety requirements of the marker.

In certain highly regulated markets such as alcohol/spirits and fuel there are significant tax cost implications for legitimate suppliers that can be avoided by non-registered criminals. Consequently non-registered criminals can sell such products at lower cost making these markets even more attractive. Additionally, whilst the costs of development and regulation around pharmaceutical production and registration can be significant, potential counterfeiters can benefit from low production costs.

Furthermore, many high value products such as whisky have strict rules on what can and cannot be added to them to be classified as Scotch whisky. For this reason, it is impossible to add an authentication marker to the bottle contents. This limits security measures to the application of authentication markers to the bottle and/or cap. However, with care, even genuine tamper-evident caps can be replaced and bottles with non-refillable closures re-filled so that the article may look unopened. This can lead to the potentially dangerous and misleading situation where a company validates that they have genuine packaging, with the implication being that the contents are genuine when, in reality, they are not. For example, the contents could be doped or refilled with anything that mimics the characteristics of the genuine product. Additionally, there are similar issues with a host of other products such as beer and other drinks, along with many other highly regulated markets. These include, but are not limited to, markets such as food stuffs, pharmaceuticals, agrochemicals, perfumes, cosmetics, fuels and synthetic motor oils.

Another source of counterfeit products entering the market may be in bars and restaurants, where opened bottles can be re-filled with cheaper spirits. Again, the security features on the bottles may be perfectly genuine but the contents are not. Consequently, a simple method to allow Trading Standards, Health and Safety inspectors or management (or even the public) to ensure that genuine products are being used is important. Of course, such systems are of considerable interest to companies that manufacture branded products as they allow the authorities to prevent the distribution of fake goods bearing their name. It is clear that the distribution of fake goods of lower quality than the genuine products can seriously damage a company's reputation amongst customers and pose significant dangers to both public health and the environment.

Since many products are made to a particular specification, one solution is to use a system whereby a product can be identified based on the chemicals and properties that are unique to that product. For example, flavourings and/or traces of specific chemicals that give certain products a unique 'signature' flavour, or by detecting traces elements that are unique to the manufacture of a product and which would be almost impossible to re-create by a counterfeiter. Some forensic tests for performing this type of analysis do exist. However, they are generally slow, require expensive equipment, an analytical laboratory, and highly trained personnel. Often suspicious materials are in the distribution chain before the results of such an analysis are available. Alternatively, products that may be completely genuine are held in quarantine or bonded warehouses until the tests have been completed. Therefore, there is a need for a test that can quickly analyse the contents of a product with inexpensive equipment and relatively untrained staff, enabling suspicious materials to be impounded with confidence pending legal proceedings and further analysis.

This invention aims to obviate or mitigate the existing disadvantages associated with known methods for product identification in the art.

SUMMARY OF INVENTION

In a first aspect, there is provided a method for product identification comprising:
  a) subjecting a sample to cyclic voltammetry, wherein the sample is subjected to a plurality of voltammetric cycles to obtain a data set for each cycle, wherein the data sets comprise data points; and
  b) comparing the data set for each cycle with a data set for a corresponding cycle of at least one known product to determine whether the sample is the known product.

In the context of the present invention, a "sample" should be understood to mean an unknown composition and a "product" should be understood to mean a known composition.

A data set is a plurality of data points corresponding to the current output recorded for each voltage point of a single voltammetric cycle. The data set generated for each cycle of voltammetry is the product of the unique combination of the interaction between the surface chemistry of the sensor, the sample being tested and the voltage being used. As each successive voltammetric cycle proceeds, the sensor and mediators can be either oxidised or reduced by the species found naturally in the samples being tested, which are in turn reduced or oxidised, respectively. That is, both the sensor and the sample composition are modified during each voltammetric cycle. As a result, the sensor produces a different output when the same voltage is passed across the sensor on the second and subsequent cycles.

A data set for a corresponding cycle of a known product is the current output recorded for an equivalent or corresponding voltammetric cycle performed on a known product under the same voltammetric parameters and conditions. That is, the data set of the first cycle obtained for the sample is compared to the data set of the first cycle obtained for the known product. This process is then repeated for each successive cycle. Surprisingly, the results obtained for each cycle are repeatable for any given product and sensor combination. Thus, the level of information obtained on the sample accumulates with each cycle and by considering the data set for each cycle independently, it is possible to identify samples with a greater degree of accuracy.

The technique of the present invention may comprise immersing a sensor connected to a potentiostat into a sample and measuring the current generated across the probe as the potential difference is cycled between set voltages. Many products contain a complex mixture of ingredients such that the pattern generated by the probe during the procedure is unique to the product type, the scanning technique employed, and the type of sensors used. The combination of these factors generates a unique fingerprint for specific brands which is then used to identify fraudulent goods. Dissolvable products such as tablets can also be analysed in a similar way once dispersed in a suitable medium.

This method is distinct from known methods that incorporate the use of multiple cycles in product identification by simply averaging out the data obtained from several cycles for the purpose of the removal of background noise or the use of multiple cycles in long term monitoring to identify fouling of the sensors. In these methods, the highly valuable and characteristic variation between data sets is lost or ignored.

The data set of a first cycle for the sample and the data for a first cycle for the at least one known product may be omitted from step b). The first voltammetric cycle may be disregarded as this cycle may provide artefacts of the methodology, for example, the first cycle may clean and/or activate the working electrode.

Optionally, the sample may be subjected to at least three voltammetric cycles. For example, the sample may be subjected to five voltammetric cycles.

The or each voltammetric cycle may cycled through an oxidative voltage range and/or a reductive voltage range. This selection of an oxidative, reductive or oxidative and reductive voltage range will depend upon whether the components within the sample is capable of being oxidised, reduced or both.

The voltage range of the voltammetric cycle may be adjusted based on several criteria such as the liquid conductivity, pH, composition, temperature, pressure and other process parameters. As particular examples, the or each voltammetric cycle may be cycled between +1V and −1V. Such a voltage range may be preferred where the method is carried out in the presence of water and/or ethanol. However, alternative potential ranges may be applied depending on the solvents used.

Optionally, comparing the data set for each cycle with a data set for a corresponding cycle of at least one known product comprises determining whether the data set for each cycle of the sample falls within a predetermined upper threshold and a predetermined lower threshold of the data set for the corresponding cycle of the at least one known product.

Optionally, subjecting the sample to cyclic voltammetry comprises subjecting the sample to a plurality of working electrodes for each voltammetric cycle. The plurality of working electrodes may be substantially identical or non-identical. In this context, "substantially identical" should be understood to mean that the plurality of working electrodes comprise the same electrode material and, where the electrode is doped with a mediator, the same mediator. Conversely, "non-identical" should be understood to mean that the plurality of working electrodes comprise different electrode material and/or are doped with a mediator. The sample may be subjected to a plurality of working electrodes simultaneously in the same sample or in a plurality of separate samples.

In one or more embodiments, step a) further comprises subjecting the sample to a plurality of non-identical working electrodes, for each voltammetric cycle to obtain a data set for each cycle for each electrode, and wherein step b) further comprises comparing the data set for each cycle for each electrode to a data set for a corresponding cycle for a corresponding electrode of at least one known product.

Subjecting the sample to a plurality of non-identical working electrodes, wherein the non-identical working electrodes comprise a different electrode material or the electrode is doped with a different mediator, provides more comprehensive analysis of the sample and/or known product. For instance the different chemistries of the electrodes interact with (i.e. oxidising or reducing) different components within the sample and/or known product, thereby building more comprehensive data sets for the sample and/or product.

Accordingly, comparing the data set for each cycle with a data set for a corresponding cycle of at least one known product may comprise determining whether the data set for each cycle for each electrode of the sample falls within a predetermined upper threshold and a predetermined lower threshold of the data set for the corresponding cycle for the corresponding electrode of the at least one known product.

The method may be used for determining whether the sample is an authentic product.

In a second aspect, there is provided a method of determining a profile for a known product, said method comprising:
  subjecting the product to cyclic voltammetry wherein the product is subjected to a plurality of voltammetric cycles to obtain a data set for each cycle, wherein the data sets comprise data points; and
  recording the profile comprising the data set for each cycle in a reference file.

The profile may be regarded as a fingerprint for a product.

In one or more embodiments, the data set for a first voltammetric cycle may not be recorded in the reference file.

Optionally, subjecting the product to cyclic voltammetry comprises subjecting the product to a plurality of substantially identical working electrodes for each voltammetric cycle to provide a data set for each cycle for each electrode. For example, the product may be subjected to a plurality of substantially identical working electrodes simultaneously in the same sample or in a plurality of separate samples. Each separate sample may comprise a different batch of the same product or may be from the same batch.

The method may further comprise:
  (i) averaging corresponding data points for the plurality of substantially identical working electrodes for a first recorded voltammetric cycle to obtain the data set for the first voltammetric cycle;

(ii) determining a standard deviation value to obtain an upper threshold and a lower threshold for each data point of the data set for the first recorded voltammetric cycle; and (iii) repeating steps (i) and (ii) for each subsequent voltammetric cycle.

As will be appreciated, the first recorded voltammetric cycle may not be the first voltammetric cycle to which the product has been subjected as the first voltammetric cycle may be not be recorded in the reference file due to potential for it to provide artefacts of the methodology.

Each data point of a data set corresponds to the current recorded at each voltage point of a voltammetric cycle. In this way, an average value for each voltage point can be determined from the current output recorded at corresponding voltages points for each electrode. The standard deviation is used to calculate the upper threshold by adding the standard deviation value to the average value for each data point. The lower threshold is calculated by the subtracting the standard deviation value from the average value of each data point. This process can be repeated for all data points in each voltammetric cycle independently. In this way, a profile consisting of multiple cycles with an amperometric range at any given voltage point on the cyclic voltammetry scan is produced for a specific product and electrode combination. If the current recorded for a sample falls within the amperometric range for equivalent voltage points, this is indicative that the sample is the product to which it is being compared.

Optionally, subjecting the product to cyclic voltammetry further comprises subjecting the product to a plurality of non-identical working electrodes during each voltammetric cycle, wherein each non-identical working electrode has an associated plurality of substantially identical working electrodes, and wherein steps (i) to (iii) are repeated for each cycle for each non-identical working electrode. A voltammetric cycle is generated from the specific interaction of an electrode surface with the product being recorded. Therefore, a plurality of non-identical working electrodes may interact with a broader range of sample components. This provides the advantage of increasing the specificity of a profile to a given product.

Each non-identical electrode may have the same or a different number of associated identical electrodes compared to another non-identical electrode. The product may be subjected to a plurality of non-identical working electrodes simultaneously in the same sample or in a plurality of separate samples. Alternatively, the product may be subjected to a plurality of non-identical working electrodes sequentially.

Optionally, the product is subjected to at least three voltammetric cycles. For example, the product may be subjected to five voltammetric cycles.

The or each voltammetric cycle may cycled through an oxidative voltage range and/or a reductive voltage range.

The voltage range of the voltammetric cycle may be adjusted based on several criteria such as the liquid conductivity, pH, composition, temperature, pressure and other process parameters. As particular examples, the or each voltammetric cycle may be cycled between +1V and −1V.

The method may further comprise entering the reference file into a database of profiles for known products. In this way, a data set recorded for a sample can be compared to a database of profiles for known products to determine if the data points fall within the expected ranges. This may be expressed as a percentage similarity score between the sample and the product profile in the database to which it is being compared. In this way, the method may be used for determining the identity of a sample. For example, a sample may be identified on the basis of a percentage similarity score of 98.8% compared to a known product.

BRIEF DESCRIPTION OF FIGURES

The accompanying drawings illustrate presently exemplary embodiments of the disclosure, and together with the general description given above and the detailed description of the embodiments given below, serve to explain, by way of example, the principles of the disclosure.

DETAILED DESCRIPTION

Figure 1:
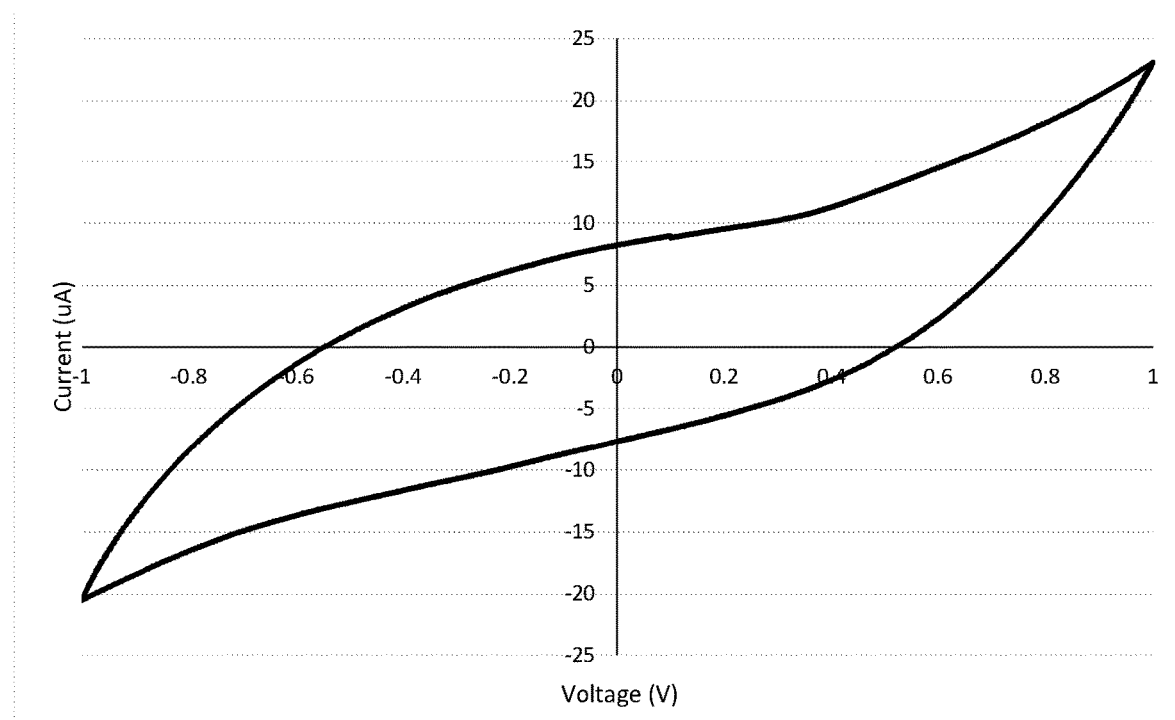
FIG. 1 shows a typical cyclic voltammetry curve for a first branded whisky sample.

FIG. 1 shows a typical voltammetry cycle based on a single cycle recorded for a first branded whisky sample, which may or may not be the first of several cyclic voltammetry (C.V.) cycles. To date, known methods have incorporated the use of multiple cycles into the identification of products by simply averaging out the data obtained from several cycles for the purpose of removing background noise or for the purpose of long term monitoring to identify fouling of the sensors.

Figure 2A:
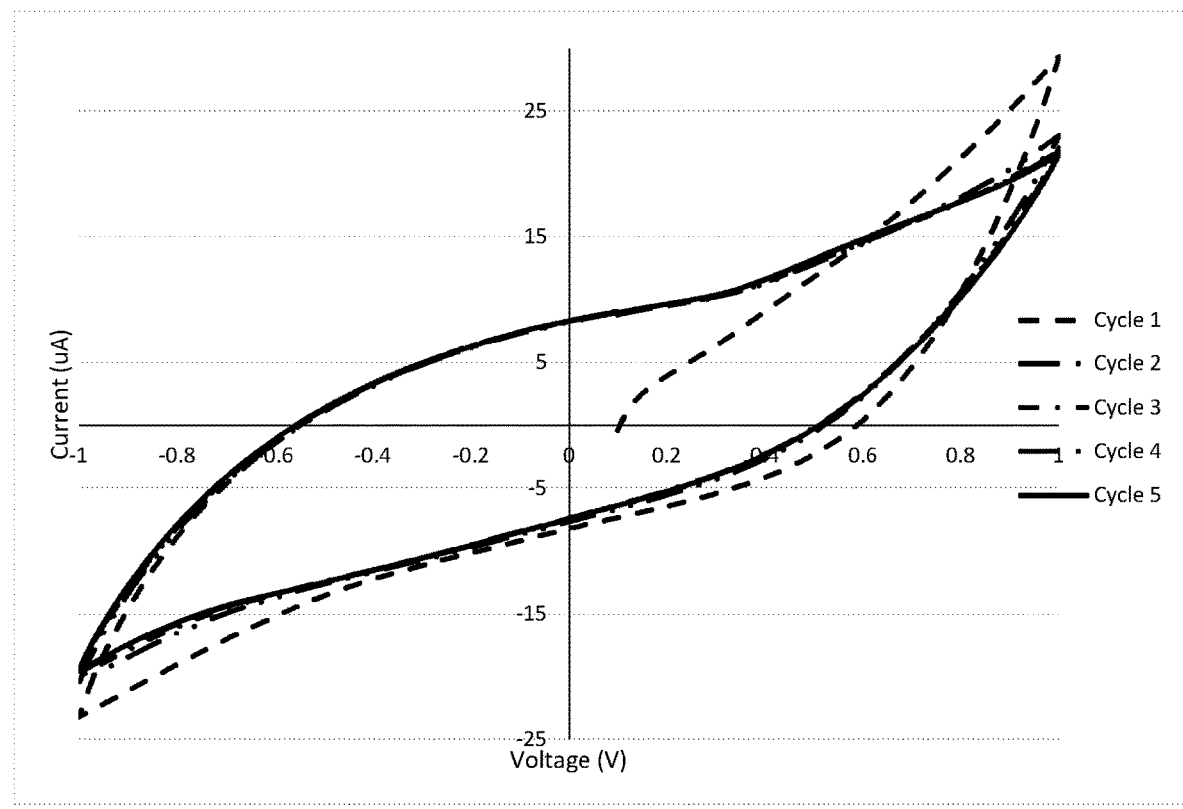
FIG. 2A shows an example of the changes observed in a set of cyclic voltammetry curves over the course of different cycles recorded for the first branded whisky sample.
Figure 2B:
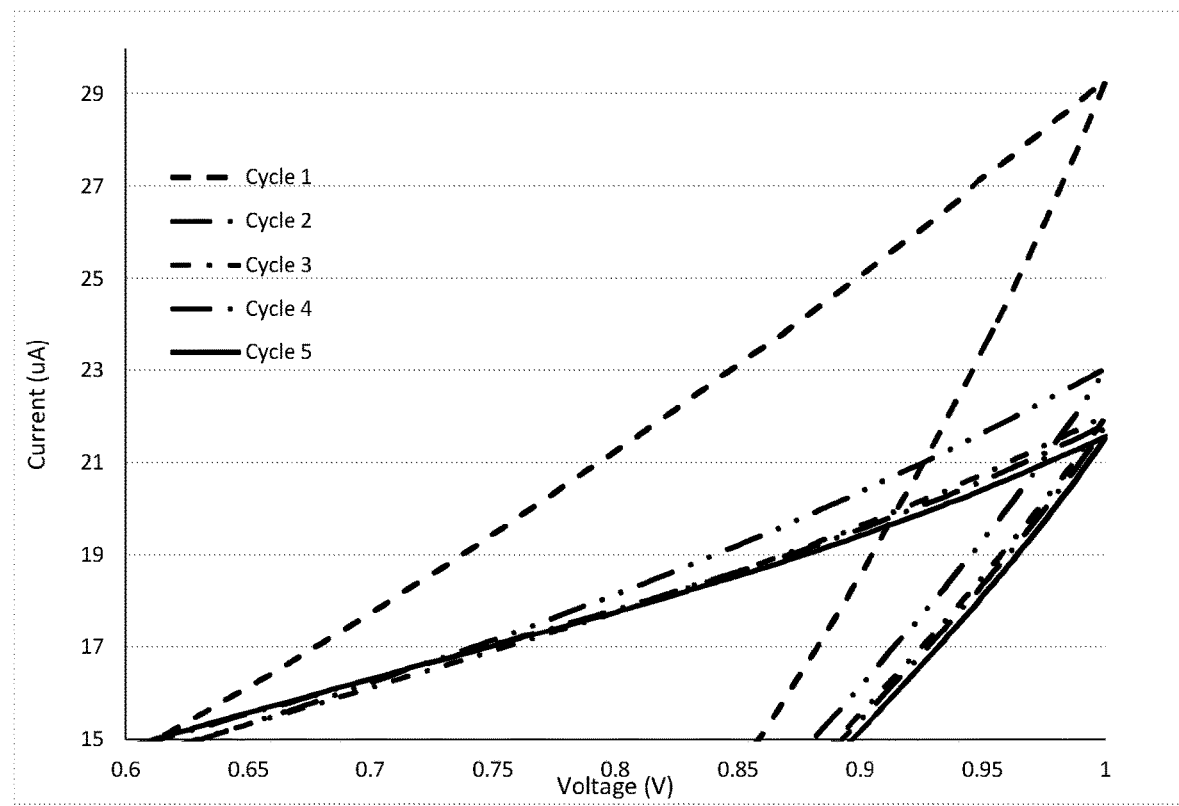
FIG. 2B shows an expanded view in the high potential region of the set of cyclic voltammetry curves shown in FIG. 2A.
Figure 2C:
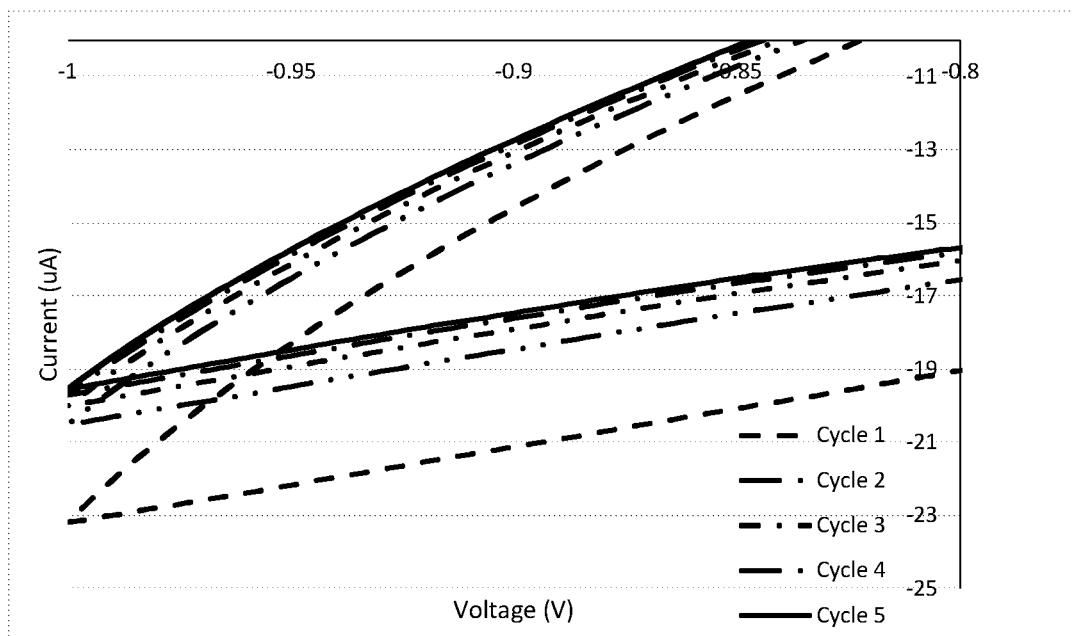
FIG. 2C shows an expanded view in the low potential region of the set of cyclic voltammetry curves shown in FIG. 2A.

However, both approaches neglect to appreciate the surprising fact that each cycle is unique and repeatable for any given product and sensor combination. An example of how the overall C.V. curve changes over the course of different cycles recorded for the first branded whisky sample can be seen in FIG. 2A. The expanded views shown in FIGS. 2B and 2C demonstrate the subtle differences observed at the extremes of the positive and negative ends of the cycles.

EXAMPLE PROCEDURE

In the following examples, Metrohm DropSens sensors were used, although other suitable sensors are known in the art. The voltammetric sensor is immersed in a liquid sample such as a beverage. Solid dissolvable products are dispersed in a suitable media prior to testing. Advantageously, no additional pre-treatment of the sample is required.

The sensor(s) may be attached to a handheld potentiostat to apply voltammetry to the sample. For example, the potentiostat may be configured to perform a plurality voltammetric cycles between −1V and +1V. The user initiates the voltammetry measurement and the current output is recorded for each voltage potential on each cycle.

The results are compared to a known product for authentication or cross-referenced against a database of known product fingerprints to identify the sample. For example, a user may upload the results to an online data storage platform, which can then be viewed remotely.

The following Examples were obtained using a potentiostat U400 by Metrohm DropSens. However, as would be appreciated by a person skilled in the art, any suitable device may be used.

Example 1: Two Leading Brands of Scotch Whisky

Figure 3:
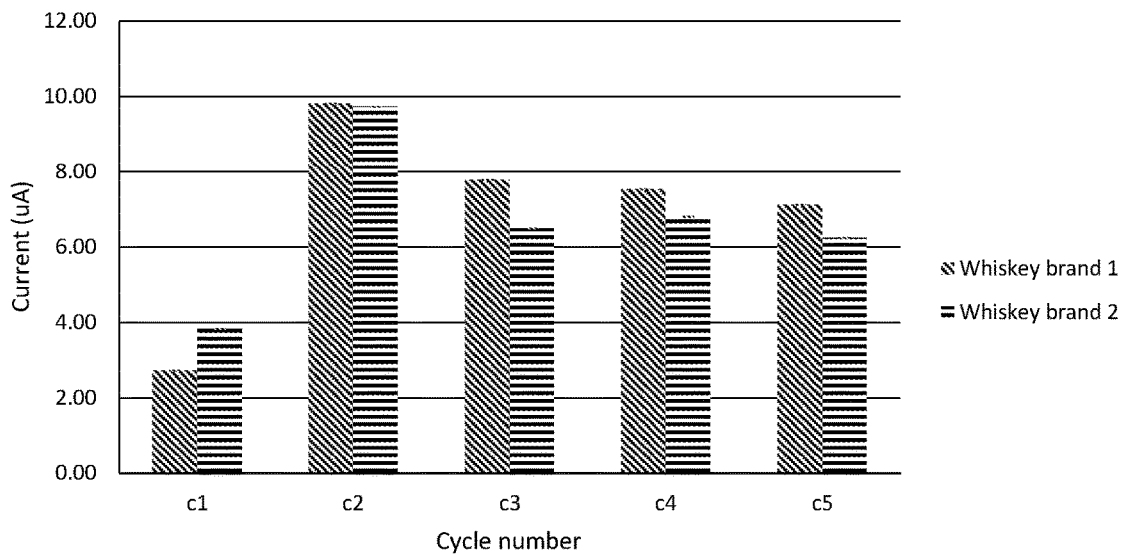
FIG. 3 shows a graph of the average response of cobalt pthalocyanine sensors in branded whisky samples at +0.2V.

To illustrate that the change in curve shape observed between cycles is repeatable, two leading brands of Scotch whisky were tested with a series of identical sensors comprising an electrode coated with a carbon-based ink doped with cobalt phthalocyanine. Three identical sensors were immersed in three separate samples of whisky brand 1 and the samples submitted to C.V. cycling between −1V and +1V at 50 mV/s for 5 cycles. The procedure was then repeated for whisky brand 2. The current recorded at specific voltages for each sensor was compared for each of the five cycles to ensure the current recorded was repeatable when using the same sample type. An example of the average result per cycle for the sample of whisky brand 1 and whisky brand 2 at +0.2V is shown in FIG. 3 and Tables 1 and 2 below.

TABLE 1

Results obtained from whisky brand 1 +0.2 V

|  | Sensor 1 | Sensor 2 | Sensor 3 | Average | STDEV |
|---|---|---|---|---|---|
| c1 | 2.50 | 2.85 | 2.85 | 2.73 | 0.20 |
| c2 | 9.65 | 9.70 | 10.10 | 9.82 | 0.25 |
| c3 | 7.37 | 7.89 | 8.10 | 7.79 | 0.38 |
| c4 | 7.45 | 7.40 | 7.79 | 7.55 | 0.21 |
| c5 | 6.90 | 7.11 | 7.36 | 7.12 | 0.23 |

TABLE 2

Results obtained from whisky brand 2 +0.2 V

|  | Sensor 1 | Sensor 2 | Sensor 3 | Average | STDEV |
|---|---|---|---|---|---|
| c1 | 3.78 | 3.84 | 3.92 | 3.85 | 0.07 |
| c2 | 9.82 | 9.85 | 9.54 | 9.74 | 0.17 |
| c3 | 6.99 | 6.10 | 6.40 | 6.50 | 0.46 |

TABLE 2-continued

Results obtained from whisky brand 2 +0.2 V

|  | Sensor 1 | Sensor 2 | Sensor 3 | Average | STDEV |
|---|---|---|---|---|---|
| c4 | 6.79667 | 6.93 | 6.69 | 6.81 | 0.12 |
| c5 | 6.24 | 6.29 | 6.24 | 6.26 | 0.03 |

The results demonstrate that when using the same sample and sensor combination the amperometric response is repeatable between corresponding samples. Furthermore, it is clear that apart from the results obtained from cycle 2 there is a significant difference in the response between whisky brand 1 and 2, as exemplified in FIG. 3. If, as could be the case in known methods, only the second cycle was used as the basis for the comparison, it would not be possible to determine whether the sample was whisky brand 1 or whisky brand 2.

Furthermore, when this strategy is expanded for all of the data points obtained from a C.V. scan (i.e. all the observed currents for all of the voltage points measured) it is possible to generate a complete fingerprint for a product. The fingerprint is generated by testing multiple identical sensors in the same sample of a known product and recording the results. An average current is then determined for each voltage point on the C.V. scan by averaging the current recorded at the corresponding voltage points on each sensor on a given cycle. The standard deviation for each value is then calculated. The standard deviation is used to calculate the upper threshold of the fingerprint by adding the standard deviation value to the average value. The lower threshold of the fingerprint is calculated by the subtracting the standard deviation value from the average value. This is repeated for each cycle independently to produce a fingerprint consisting of multiple cycles with an amperometric range at any given voltage point on the C.V. scan for a specific product and sensor combination. If the current recorded for an unknown tested sample falls within amperometric range, this is indicative that the sample it is the product to which it is being compared.

Example 2: Comparison of Three Whisky Brands

To test a sample against the fingerprint, the same sensor type and testing methodology is used to generate the C.V. data set as was used for the known product. The recorded current for each voltage is then compared to the fingerprint to determine if it falls within the expected ranges. This may be expressed as a percentage similarity score between the unknown sample and the product fingerprint in the database to which it is being compared.

To illustrate this, a database consisting of three whisky brands was created using sensors coated in carbon doped with Prussian Blue. A blind test was performed to determine if whisky brand 2 could be accurately identified. Whisky brand 2 (unknown to the operator) was tested using the same Prussian blue doped carbon electrode type and methodology and the results were compared with the fingerprints from whisky brands 1, 2 and 3.

TABLE 3

% similarity of whisky brand 2 to finger prints 1, 2 and 3

|  | Whisky brand 1 | Whisky brand 2 | Whisky brand 3 |
|---|---|---|---|
| % similarity | 21 | 100 | 47 |

As shown in Table 3, the sample correctly matches the fingerprint from whisky brand 2. In contrast, it has only a 21% similarity to whisky brand 1 and a 46% similarity to whisky brand 3.

Figure 4:
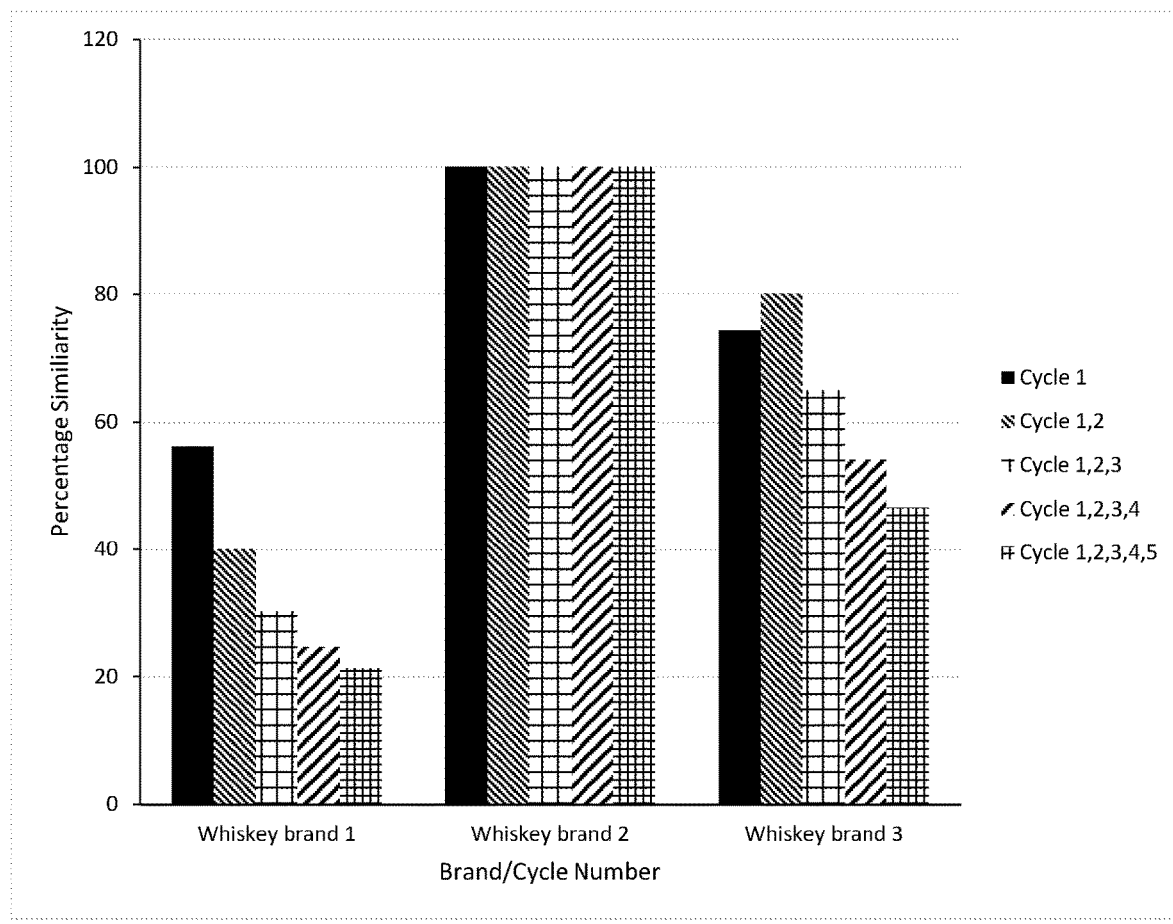
FIG. 4 shows a graph of the changes observed in the percentage similarity score recorded for three branded whisky samples compared to an unknown sample over the course of five voltammetric cycles.

FIG. 4 and Table 4 show how the innovation of analysing multiple cycles independently of one another to more accurately dismiss a sample as not matching the product fingerprint can be demonstrated when the similarity of the sample to product fingerprint is compared using fewer cycles. Specifically, when only a single cycle is used, the percentage similarities of whisky brands 1 and 3 to the test sample increases to 56% and 74%, respectively. Further, as can be seen, a general decrease in the percentage similarity of whisky brands 1 and 3 is observed as the number of cycles increases. In contrast, it can be seen that the high percentage similarity score is observed for whisky brand 2 is maintained.

TABLE 4

Analysis of multiple cycles

|  | Whisky brand 1 | Whisky brand 2 | Whisky brand 3 |
|---|---|---|---|
| Cycle 1 | 56 | 100 | 74 |
| Cycle 1, 2 | 40 | 100 | 80 |
| Cycle 1, 2, 3 | 30 | 100 | 65 |
| Cycle 1, 2, 3, 4 | 25 | 100 | 54 |
| Cycle 1, 2, 3, 4, 5 | 21 | 100 | 47 |

Figure 5:
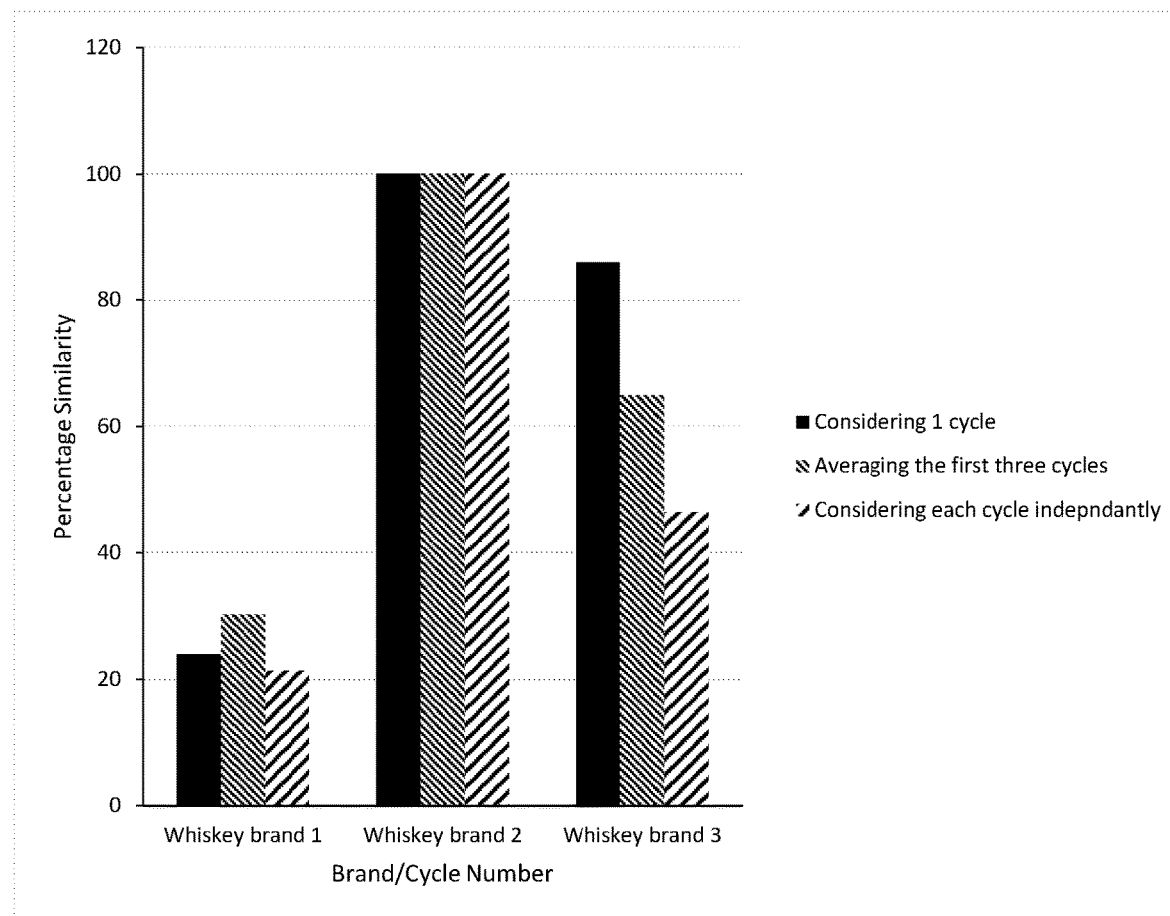
FIG. 5 shows a graph of the percentage similarity score recorded for three branded whisky samples compared to an unknown sample by considering a) cycle 1 only; b) an average of the first three cycles; and c) five cycles independently.

FIG. 5 and Table 5 show a comparison of the results obtained using the method of the present invention with those obtained by considering the first cycle only and those obtained by averaging the first three cycles. The results clearly demonstrate that by analysing each corresponding data set of multiple cycles independently of one another, it is possible to more accurately distinguish an authentic candidate sample from those that are not.

TABLE 5

Comparison of results

|  | Whisky brand 1 | Whisky brand 2 | Whisky brand 3 |
|---|---|---|---|
| Considering one cycle only (cycle 2) | 24 | 100 | 86 |
| Averaging the first three cycles | 30 | 100 | 65 |
| Considering each cycle independently (five cycles) | 21 | 100 | 47 |

Example 3: Comparison of Different Sensor Types

Furthermore, as each CV data set is generated from the combination of sensor surface chemistry and the sample being tested, the specificity of the data set to the fingerprint of a given product can be increased by using a plurality of sensors, each having different surface chemistries. The use of a plurality of sensors having different surface chemistries enables the detection of a broader range of sample components.

To illustrate this, a database using six different sensor types, the details of which are provided in Table 6, was generated for two leading vodka brands.

TABLE 6

Figure 6:
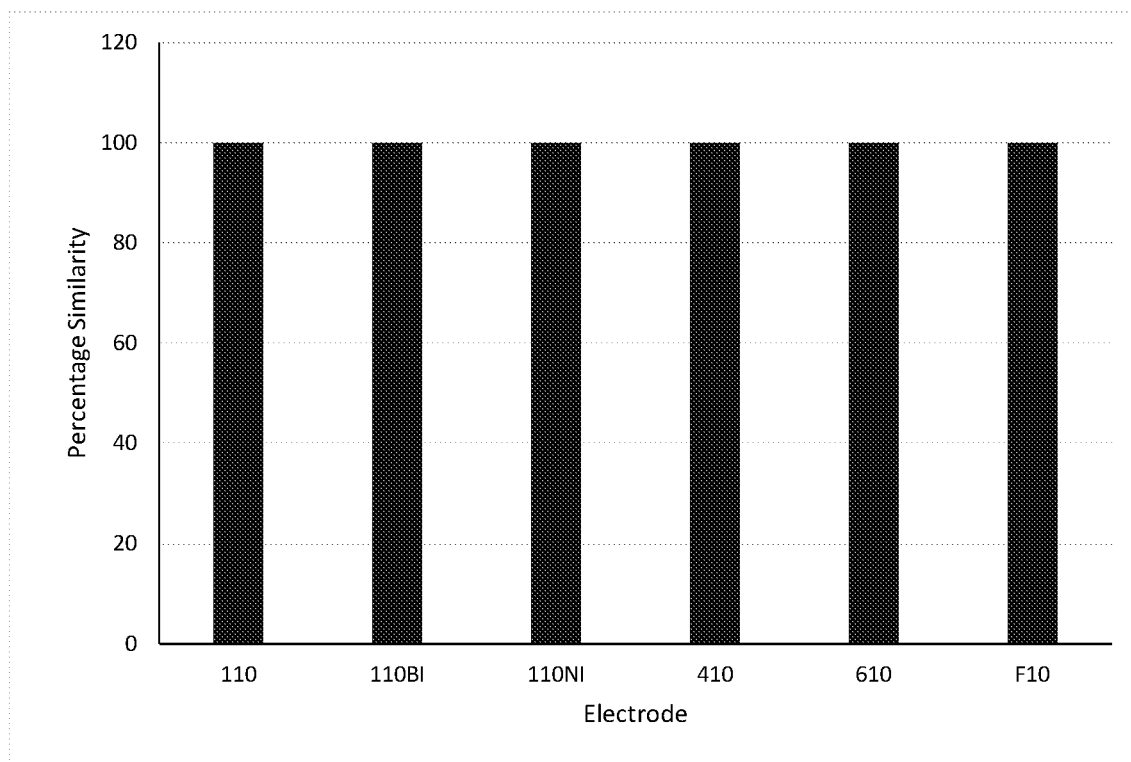
FIG. 6 shows a graph of the percentage similarity score recorded for vodka brand 1 vs vodka brand 1 using six different electrode types.
Figure 7:
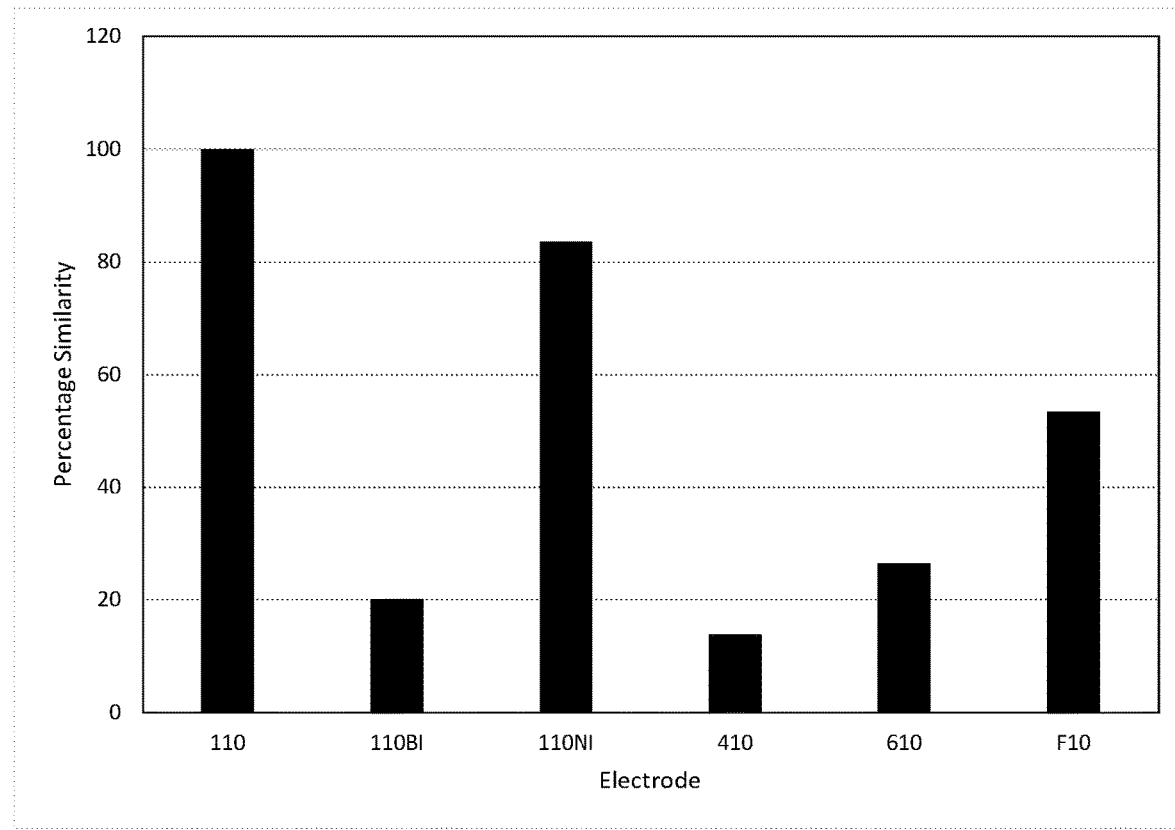
FIG. 7 shows a graph of the percentage similarity recorded for vodka brand 1 vs vodka brand 2 using six different electrode types.

Composition of working surface for sensors used FIGS. 6 and 7. All sensor types were obtained from Metrohm DropSens.

| Abbreviation | Sensor Type |
|---|---|
| 110 | Carbon |
| 110Bi | Carbon doped with Bismuth |
| 110Ni | Carbon doped with nickel |
| 410 | Carbon doped with cobalt phthalocyanine |
| 610 | Carbon doped with Meldola's Blue |
| F10 | Carbon doped with Ferrocene |

As can be seen in FIG. 6, a comparison of Brand 1 against Brand 1 found 100% similarity for all six electrode types. However, as shown in FIG. 7, a comparison of Brand 1 against Brand 2 showed that while most of the sensor types were significantly different some were very similar. In particular, the results obtained by sensor 110 indicated a 100% similarity between brand 1 and brand 2. However, while identical results were obtained for sensor 110 for brand 1 and brand 2, it will be appreciated that for another two brands, sensor 110 would be able to determine between the two as the response is highly dependent on the make-up of the product, and even the product batch, being tested. Therefore, using multiple sensors creates fingerprints that on at least some of the surface types will show a significant difference between even similar sample types. This provides the advantage of a more accurate fingerprint.

Example: Comparison of Soft Drinks

Figure 8:
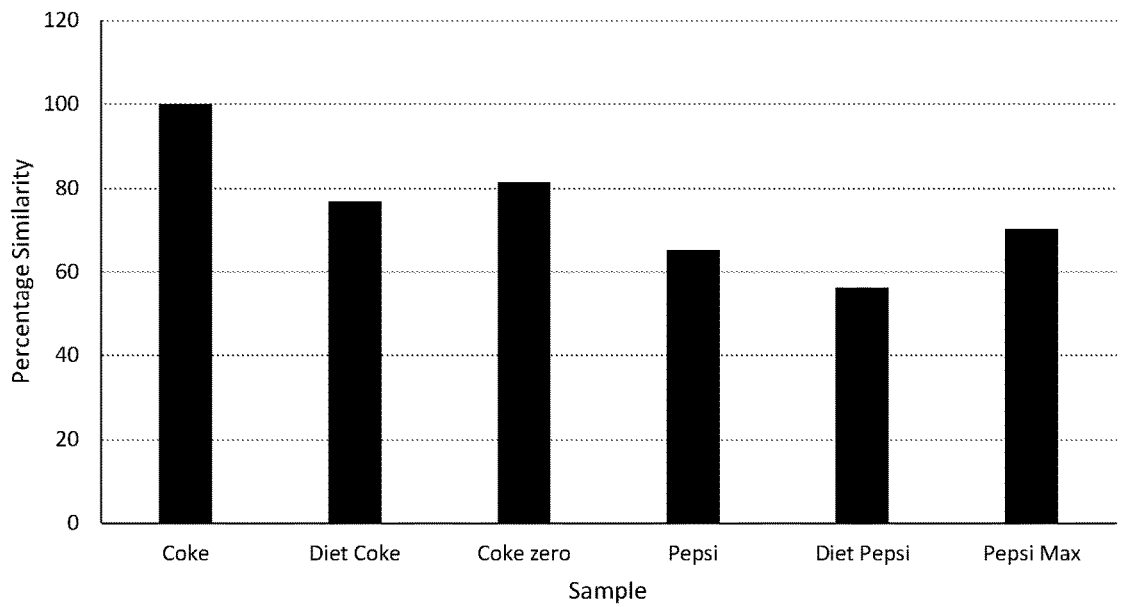
FIG. 8 shows a graph of the percentage similarity score recorded for Coca Cola® when tested against a database of other leading brand soft drinks.

FIG. 8 shows a comparison of Coca Cola® against a database of other leading brand soft drinks. Using the method described herein, it was possible to clearly distinguish between the authentic product and eliminate those that were not, in order to allow for sample identification.

Example 5: Comparison of Pharmaceuticals

Figure 9:
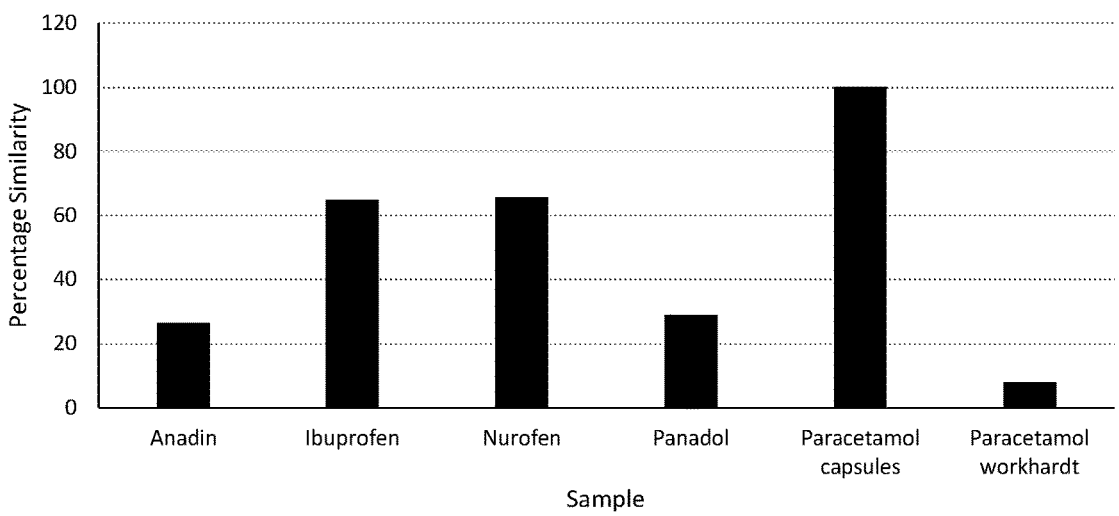
FIG. 9 shows a graph of the percentage similarity recorded for dissolved paracetamol when tested against a database of leading brand headache medicaments.

The method is also applicable to dissolvable solid products, which can be dispersed in a suitable media prior to testing. For example, FIG. 9 shows a comparison of an aqueous solution of paracetamol against a database of leading brand headache medicaments. In this case, the dissolved sample was again correctly identified as paracetamol.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A method for electrochemical product identification comprising:
   detecting a change to a composition of a sample by subjecting the sample to cyclic voltammetry, wherein the sample is subjected to a plurality of voltammetric cycles to obtain a data set for each voltammetric cycle, wherein each data set comprises data points and each data point corresponds to a current output recorded by a sensor for a voltage point of the respective voltammetric cycle;

determining, for each voltammetric cycle, whether the current output recorded for each voltage point corresponds to a range associated with a current output at a corresponding voltage point of a corresponding voltammetric cycle of at least one known product; and authenticating the sample as one of the at least one known product based on a percentage similarity between the current output at each voltage point of each voltammetric cycle for the sample and the current output at the corresponding voltage point of the corresponding voltammetric cycle of the at least one known product.

2. The method according to claim 1, wherein the data set of a first voltammetric cycle of the sample and a data set of a first voltammetric cycle of the at least one known product are omitted from the determining step.

3. The method according to claim 1, wherein the sample is subjected to at least three voltammetric cycles.

4. The method according to claim 1, wherein the sample is subjected to five voltammetric cycles.

5. The method according to claim 1, wherein each voltammetric cycle is cycled through an oxidative voltage range and/or a reductive voltage range.

6. The method according to claim 1, wherein each voltammetric cycle is cycled between +1V and −1V.

7. The method according to claim 1, wherein the determining step further comprises determining whether the data set for each voltammetric cycle of the sample falls within a predetermined upper threshold and a predetermined lower threshold of a data set for the corresponding voltammetric cycle of the at least one known product.

8. The method according to claim 1, wherein the detecting step further comprises subjecting the sample to a plurality of non-identical working electrodes for each voltammetric cycle to obtain a data set for each voltammetric cycle for each working electrode, and wherein the determining step further comprises comparing the data set for each voltammetric cycle for each working electrode to a data set for a corresponding voltammetric cycle for a corresponding working electrode of the at least one known product.

9. The method according to claim 8 wherein the determining step further comprises determining whether the data set for each voltammetric cycle for each working electrode of the sample falls within a predetermined upper threshold and a predetermined lower threshold of the data set for the corresponding voltammetric cycle for the corresponding working electrode of the at least one known product.

10. The method according to claim 1 for determining whether the sample is an authentic product.

* * * * *